US012142857B2

(12) United States Patent
Leung et al.

(10) Patent No.: US 12,142,857 B2
(45) Date of Patent: Nov. 12, 2024

(54) PATTERN RECONFIGURABLE ANTENNA

(71) Applicant: City University of Hong Kong, Kowloon (HK)

(72) Inventors: Kwok Wa Leung, Kowloon (HK); Xiyao Liu, Kowloon (HK); Nan Yang, Guangdong (CN)

(73) Assignee: City University of Hong Kong, Kowloon (HK)

( * ) Notice: Subject to any disclaimer, the term of this patent is extended or adjusted under 35 U.S.C. 154(b) by 209 days.

(21) Appl. No.: 17/890,464

(22) Filed: Aug. 18, 2022

(65) Prior Publication Data

US 2024/0063546 A1 Feb. 22, 2024

(51) Int. Cl.
*H01Q 9/04* (2006.01)
*H01Q 3/24* (2006.01)

(52) U.S. Cl.
CPC ........... *H01Q 9/0485* (2013.01); *H01Q 3/247* (2013.01)

(58) Field of Classification Search
CPC ..... H01Q 3/247; H01Q 9/0485; H01Q 9/0492
See application file for complete search history.

(56) References Cited

U.S. PATENT DOCUMENTS

| | | | | |
|---|---|---|---|---|
| 7,443,363 B2 | 10/2008 | Ying | | |
| 11,145,973 B2 | 10/2021 | Pan et al. | | |
| 11,329,375 B1 * | 5/2022 | West | H01Q 23/00 | |
| 2003/0151548 A1 * | 8/2003 | Kingsley | H01Q 19/106 | 342/368 |
| 2019/0379104 A1 * | 12/2019 | Leung | H01Q 1/1221 | |
| 2019/0379123 A1 * | 12/2019 | Leung | H01Q 1/22 | |
| 2019/0379126 A1 * | 12/2019 | Leung | H01Q 9/0485 | |
| 2023/0111583 A1 * | 4/2023 | Kim | H01Q 9/0485 | 343/702 |

FOREIGN PATENT DOCUMENTS

| | | |
|---|---|---|
| CN | 104868238 | 8/2015 |
| CN | 105140636 | 12/2015 |
| EP | 3800732 | 4/2021 |

OTHER PUBLICATIONS

L. Ge, Y. Li, J. Wang, and C.-Y.-D. Sim, "A low-profile reconfigurable cavity-backed slot antenna with frequency polarization and radiation pattern agility," IEEE Trans. Antennas Propag., vol. 65, No. 5, pp. 2182-2189, May 2017.

(Continued)

*Primary Examiner* — Dameon E Levi
*Assistant Examiner* — Leah Rosenberg
(74) *Attorney, Agent, or Firm* — Renner, Kenner, Greive, Bobak, Taylor & Weber

(57) ABSTRACT

An antenna includes a radiator arrangement and a feed mechanism operably coupled with the radiator arrangement for affecting operation of the radiator arrangement. The feed mechanism is configured to selectively operate in at least three different states. When the feed mechanism operates in a first state, the antenna operates in a first mode to provide a broadside radiation pattern. When the feed mechanism operates in a second state, the antenna operates in a second mode to provide an omnidirectional radiation pattern. When the feed mechanism operates in a third state, the antenna operates in a third mode to provide a unilateral radiation pattern.

24 Claims, 20 Drawing Sheets

Figure 17

(56) References Cited

OTHER PUBLICATIONS

J. Hu, X. Yang, L. Ge, Z. Guo, Z. -C. Hao, and H. Wong, "A reconfigurable 1×4 circularly polarized patch array antenna with frequency, radiation pattern, and polarization agility," IEEE Trans. Antennas Propag., vol. 69, No. 8, pp. 5124-5129, Aug. 2021.
S. -L. Chen, P. -Y. Qin, W. Lin, and Y. J. Guo, "Pattern-reconfigurable antenna with five switchable beams in elevation plane," IEEE Antennas Wireless Propag. Lett., vol. 17, No. 3, pp. 454-457, Mar. 2018.
X. -Y. Wang, S. -C. Tang, and J. -X. Chen, "Differential-fed pattern-reconfigurable dielectric patch antenna and array with low cross-polarization," IEEE Trans. Antennas Propag., doi: 10.1109/TAP.2021.3125363.
N. -W. Liu, L. Zhu, Z. -X. Liu, Z. -Y. Zhang, G. Fu, and Y. Liu, "Cross-polarization reduction of a shorted patch antenna with broadside radiation using a pair of open-ended stubs," IEEE Trans. Antennas Propag., vol. 68, No. 1, pp. 13-20, Jan. 2020.
X. Zhang, K. -D. Hong, L. Zhu, X. -K. Bi, and T. Yuan, "Wideband differentially fed patch antennas under dual high- order modes for stable high gain," IEEE Trans. Antennas Propag., vol. 69, No. 1, pp. 508-513, Jan. 2021.
M. Zou and J. Pan, "Investigation of resonant modes in wideband hybrid omnidirectional rectangular dielectric resonator antenna," IEEE Trans. Antennas Propag., vol. 63, No. 7, pp. 3272-3275, Jul. 2015.
Z. X. Xia, K. W. Leung, and K. Lu, "3-D-printed wideband multi-ring dielectric resonator antenna," IEEE Antennas Wireless Propag. Lett., vol. 18, No. 10, pp. 2110-2114, Oct. 2019.
L. Guo, K. W. Leung, and Y. M. Pan, "Compact unidirectional ring dielectric resonator antennas with lateral radiation," EEE Trans. Antennas Propag., vol. 63, No. 12, pp. 5334-5342, Dec. 2015.
Z. Liang, S. Lv, Y. Li, J. Liu, and Y. Long, "Compact folded slot antenna and its endfire arrays with high gain and vertical polarization," IEEE Antennas Wireless Propag. Lett., vol. 19, No. 5, pp. 786-790, May 2020.
Y. M. Pan, K. W. Leung, and L. Guo, "Compact laterally radiating dielectric resonator antenna with small ground plane," IEEE Trans. Antennas Propag., vol. 65, No. 8, pp. 4305-4310, Aug. 2017.
W. Gao, S. J. Chen, W. Withayachumnankul, and C. Fumeaux, "Horizontally polarized 360° beam-steerable frequency-reconfigurable antenna," IEEE Trans. Antennas Propag., vol. 67, No. 8, pp. 5231-5242, Aug. 2019.
L. Ge, M. Li, Y. Li, H. Wong, and K. -M. Luk, "Linearly polarized and circularly polarized wideband dipole antennas with reconfigurable beam direction," IEEE Trans. Antennas Propag., vol. 66, No. 4, pp. 1747-1755, Apr. 2018.
X. Yi, L. Huitema, and H. Wong, "Polarization and pattern reconfigurable cuboid quadrifilar helical antenna," IEEE Trans. Antennas Propag., vol. 66, No. 6, pp. 2707-2715, Jun. 2018.
S. Ahdi Rezaeieh, A. Zamani, and A. M. Abbosh, "Pattern reconfigurable wideband loop antenna for thorax imaging," EEE Trans. Antennas Propag., vol. 67, No. 8, pp. 5104-5114, Aug. 2019.
G. B. Zhang, R. C. Gough, M. R. Moorefield, K. J. Cho, A. T. Ohta, and W. A. Shiroma, "A liquid-metal polarization-pattern-reconfigurable dipole antenna," IEEE Antennas Wireless Propag. Lett., vol. 17, No. 1, pp. 50-53, Jan. 2018.
W. Lin, H. Wong, and R. W. Ziolkowski, "Circularly polarized antenna with reconfigurable broadside and conical beams facilitated by a mode switchable feed network," IEEE Trans. Antennas Propag., vol. 66, No. 2, pp. 996-1001, Feb. 2018.
X. Ding, Z. Zhao, Y. Yang, Z. Nie, and Q. H. Liu, "A low-profile and stacked patch antenna for pattern-reconfigurable applications," IEEE Trans. Antennas Propag., vol. 67, No. 7, pp. 4830-4835, Jul. 2019.
J. Ouyang, Y. M. Pan, and S. Y. Zheng, "Center-fed unilateral and pattern reconfigurable planar antennas with slotted ground plane," IEEE Trans. Antennas Propag., vol. 66, No. 10, pp. 5139-5149, Oct. 2018.
M. Tang, B. Zhou, and R. W. Ziolkowski, "Low-profile, electrically small, huygens source antenna with pattern-reconfigurability that covers the entire azimuthal plane," IEEE Trans. Antennas Propag., vol. 65, No. 3, pp. 1063-1072, Mar. 2017.
S. Long, M. McAllister, and L. Shen, "The resonant cylindrical dielectric cavity antenna," IEEE Trans. Antennas Propag., vol. 31, No. 3, pp. 406-412, May 1983.
R. K. Mongia and p. Bhartia, "Dielectric resonator antennas—a review and general design relations for resonant frequency and bandwidth," Int. J. Microw. Millim. Wave Comput. Aided Eng., vol. 4, No. 3, pp. 230-247, 1994.
L. K. Hady, A. A. Kishk, and D. Kajfez, "Dual-band compact DRA with circular and monopole-like linear polarizations as a concept for GPS and WLAN applications," IEEE Trans. Antennas Propag., vol. 57, No. 9, pp. 2591-2598, Sep. 2009.
A. Petosa, Dielectric Resonator Antenna Handbook. Norwood, MA, USA: Artech House, Chapter. 3, 2007.
L. Huitema, M. Koubeissi, M. Mouhamadou, E. Arnaud, C. Decroze, and T. Monediere, "Compact and multiband dielectric resonator antenna with pattern diversity for multistandard mobile handheld devices," IEEE Trans. Antennas Propag., vol. 59, No. 11, pp. 4201-4208, Nov. 2011.
R. Movahedinia A.-R. Sebak M. R. Chaharmir M. R. Nikkhah and A. A. Kishk, "X-band circularly polarized electronically steerable parasitic array radiator of DRA," IEEE Trans. Antennas Propag., vol. 66 No. 2 pp. 721-728, Feb. 2018.
Z. Chen, Q. Liu, B. Sanz-Izquierdo, H. Liu, J. Yu, and X. Chen, "A wideband circular-polarized beam steering dielectric resonator antenna using gravitational ball lens," IEEE Trans. Antennas Propag., vol. 69 No. 5 pp. 2963-2968, May 2021.
L. B. Mabrouk, M. Al-Hasan, M. Nedil, T. A. Denidni, and A.-R. Sebak, "A novel design of radiation pattern-reconfigurable antenna system for millimeter-wave 5G applications," IEEE Trans. Antennas Propag., vol. 68 No. 4 pp. 2585-2592, Apr. 2020.
X. Liu, K. W. Leung, T. Zhang, N. Yang, P. Gu, and R. Chen, "An electrically controlled pattern- and polarization-reconfigurable cylindrical dielectric resonator antenna," IEEE Antennas Wireless Propag. Lett., vol. 20, No. 12, pp. 2309-2313, Dec. 2021.
Y. -H. Ke, L. -L. Yang, and J. -X. Chen, "A pattern-reconfigurable dielectric resonator antenna based on switchable directors," IEEE Antennas Wireless Propag. Lett., vol. 21, No. 3, pp. 536-540, Mar. 2022.
Z. Chen, Z. Song, H. Liu, X. Liu, J. Yu, and X. Chen, "A compact phase-controlled pattern-reconfigurable dielectric resonator antenna for passive wide-angle beam scanning," IEEE Trans. Antennas Propag., vol. 69, No. 5, pp. 2981-2986, May 2021.
Z. Chen, I. Shoaib, Y. Yao, J. Yu, X. Chen, and C. G. Parini, "Pattern-reconfigurable dual-polarized dielectric resonator antenna," IEEE Antennas Wireless Propag. Lett., vol. 15, pp. 1273-1276, Dec. 2016.
B. Ahn, H.-W. Jo, J.-S. Yoo, J.-W. Yu, and H. L. Lee, "Pattern reconfigurable high gain spherical dielectric resonator antenna operating on higher order mode," IEEE Antennas Wireless Propag. Lett., vol. 18, No. 1, pp. 128-132, Jan. 2019.
L. Zhong, J. Hong and H. Zhou, "A novel pattern-reconfigurable cylindrical dielectric resonator antenna with enhanced gain," IEEE Antennas Wireless Propag. Lett., vol. 15, pp. 1253-1256, Dec. 2016.
J. Ren, Z. Zhao, Z. H. Wei, H. M. Ren, Z. Chen, Y. Liu, and Y. Z. Yin, "Radiation pattern and polarization reconfigurable antenna using dielectric liquid," IEEE Trans. Antennas Propag., vol. 68, No. 12, pp. 8174-8179, Dec. 2020.
Z. Chen and H. Wong, "Wideband glass and liquid cylindrical dielectric resonator antenna for pattern reconfigurable design," IEEE Trans. Antennas Propag., vol. 65, No. 5, pp. 2157-2164, May 2017.
NXP, "BAP55LX: Silicon PIN diode," BAP55LX datasheet, Feb. 2019. Available: https://www.nxp.com/docs/en/data-sheet/BAP55LX.pdf.

* cited by examiner

Antenna I

Antenna II

Antenna III

PATTERN RECONFIGURABLE ANTENNA

TECHNICAL FIELD

The invention relates to a pattern reconfigurable antenna.

BACKGROUND

Pattern reconfigurable antennas are antennas known to provide radiation patterns that can be modified dynamically when in use.

SUMMARY OF THE INVENTION

In a first aspect of the invention, there is provided an antenna comprising a radiator arrangement and a feed mechanism operably coupled with the radiator arrangement for affecting operation of the radiator arrangement. The feed mechanism is configured to selectively operate in, at least, a first state such that the antenna operates in a first mode to provide a broadside radiation pattern, a second state such that the antenna operates in a second mode to provide an omnidirectional radiation pattern, and a third state such that the antenna operates in a third mode to provide a unilateral radiation pattern. The antenna is a pattern reconfigurable antenna with only or at least the radiation pattern being reconfigurable. In some examples, one or more other properties of the antenna are also reconfigurable. The antenna may be used as transmit and/or receive antenna.

Optionally, the antenna is arranged to operate at substantially the same frequency or frequency band in at least two or all of: the first mode, the second mode, and the third mode. In one example, the frequency band includes the 2.4 GHz ISM band.

Optionally, the broadside radiation pattern, the omnidirectional radiation pattern, and the unilateral radiation pattern selectively provided by the antenna have substantially the same polarization. Optionally, the feed mechanism is not arranged to affect polarization of the radiation patterns provided by the antenna.

Optionally, the broadside radiation pattern provided by the antenna has a generally vertically polarized electric field. Optionally, the omnidirectional radiation pattern provided by the antenna has a generally vertically polarized electric field. Optionally, the unilateral radiation pattern provided by the antenna has a generally vertically polarized electric field.

Optionally, the unilateral radiation pattern is based on a combination of the broadside radiation pattern and the omnidirectional radiation pattern. In one example, the unilateral radiation pattern may be a combination of the broadside radiation pattern and the omnidirectional radiation pattern.

Optionally, the antenna further comprises a substrate with a first side and a second side opposite the first side, and a ground plane arranged on the first side of the substrate. The substrate may be a PCB substrate, with one or more substrate layers. The substrate may be disc or plate like.

Optionally, the radiator arrangement are arranged at least partly on the ground plane.

Optionally, the radiator arrangement comprises a dielectric resonator arranged on the ground plane and a parasitic element (or monopole element). In one example, the dielectric resonator can facilitate operation of the antenna as a dielectric resonator antenna. In one example, the parasitic element can facilitate operation of the antenna as a parasitic monopole antenna.

Optionally, the dielectric resonator antenna is loaded by the parasitic monopole antenna.

Optionally, in plan view, ground plane occupies a larger footprint than the dielectric resonator.

Optionally, the dielectric resonator arranged generally centrally of the ground plane.

Optionally, the dielectric resonator includes a body with a hole, and the parasitic element is arranged at least partly (e.g., substantially entirely) in the hole.

Optionally, the body defines a central axis along an axial direction and the hole extends along an axis offset from and parallel to the central axis.

Optionally, the hole is a through-hole extending through the body.

Optionally, the hole is a generally cylindrical hole.

Optionally, the body comprises a first portion arranged on the ground plane and a second portion arranged on the first portion. The first portion may be operable to facilitate impedance matching of the antenna. The first portion may be made of one or more dielectric materials, and may have a first dielectric constant or effective dielectric constant. The second portion may be made of one or more dielectric materials, and may have a second dielectric constant or effective dielectric constant different from the first dielectric constant or effective dielectric constant. The second dielectric constant or effective dielectric constant may be at least 2 times, at least 2.5 times, or at least 2.6 times of the first dielectric constant or effective dielectric constant.

Optionally, the body further comprises a third portion arranged on the second portion. The third portion may be made of one or more dielectric materials, and may have a third dielectric constant or effective dielectric constant. The third portion may be operable to facilitate the providing of the unilateral radiation pattern. The third dielectric constant or effective dielectric constant may be different from the second dielectric constant or effective dielectric constant. The third dielectric constant or effective dielectric constant may be substantially the same as the first dielectric constant or effective dielectric constant.

Optionally, the second portion is arranged directly between the first portion and third portion.

Optionally, the body consists of (only) the first portion, the second portion, and the third portion.

Optionally, the body is generally cylindrical or prismatic. Optionally, the first portion, the second portion and the third portion include substantially the same cross sectional shape and size.

The first portion has a first axial dimension (e.g., height, perpendicular to the ground plane), the second portion has a second axial dimension (e.g., height, perpendicular to the ground plane), and the third portion has a third axial dimension (e.g., height, perpendicular to the ground plane). Optionally, the second axial dimension is larger than the first axial dimension. In one example, the second axial dimension is at least 2 times, at least 2.5 times, or at least 3 times the first axial dimension. Optionally, the second axial dimension is larger than the third axial dimension. Optionally, the third axial dimension is larger than the first axial dimension. In one example, the third axial dimension is at least 1.5 times, at least 1.75 times, or at least 2 times the first axial dimension. In one example, the first axial dimension, the second axial dimension, and the third axial dimension are in a ratio of about 1:3:2.

Optionally, the parasitic element is arranged centrally of the hole, e.g., without touching the dielectric resonator.

Optionally, the parasitic element is connected with, e.g., soldered to, the ground plane.

Optionally, the parasitic element is in the form of a probe. The probe may be generally cylindrical or prismatic. The probe may be made of metal material(s), such as copper.

Optionally, the parasitic element extends at least partly through the substrate.

Optionally, an end of the parasitic element is arranged in a portion of the hole in the second portion. In other words, the parasitic element terminates at one end in the portion of the hole in the second portion of the body.

Optionally, in plan view, the ground plane defines a center and the parasitic element is offset from the center.

Optionally, the feed mechanism comprises: a slot formed in the ground plane, a feedline arrangement arranged on the second side of the substrate, and a switch arrangement. The switch arrangement is operably connected with the feedline arrangement and the slot for selectively affecting operation of the feedline arrangement and the slot hence operation mode of the antenna.

Optionally, when the feed mechanism operates in the first state, the switch arrangement facilitates activation of a radiation mode of the dielectric resonator and/or a radiation mode of the slot. The radiation mode of the dielectric resonator may include $HEM_{11+\delta}$ radiation mode.

Optionally, when the feed mechanism operates in the second state, the switch arrangement facilitates operation of the parasitic element as a parasitic monopole.

Optionally, when the feed mechanism operates in the second state, the switch arrangement facilitates (i) activation of the radiation mode of the dielectric resonator and/or the radiation mode of the slot and (ii) operation of the parasitic element as a parasitic monopole. The radiation mode of the dielectric resonator may include $HEM_{11+\delta}$ radiation mode.

Optionally, the switch arrangement comprises a plurality of switch elements operably coupled with the feedline arrangement and the slot.

Optionally, the plurality of switch elements include one or more first switch elements operably coupled with the slot and one or more second switch elements operably coupled with the feedline arrangement. Optionally, the one or more first switch elements are operated in a first operation state and the one or more second switch elements are operated in a second operation state when the feed mechanism is operate in the first state. Optionally, the one or more first switch elements are operated in the second operation state and the one or more second switch elements are operated in the first operation state when the feed mechanism is operate in the second state. Optionally, the one or more first switch elements and the one or more second switch elements are operated in the first operation state when the feed mechanism is operate in the third state. Optionally, the first operation state is an OFF state (non-conducting) and the second operation state is an ON state (conducting).

Optionally, the plurality of switch elements are a plurality of diodes.

Optionally, the plurality of switch elements are symmetrically disposed about an axis. The axis may be an axis of symmetry of the feedline assembly.

Optionally, the one or more first switch elements comprise a plurality of first diodes each respectively connected on the feedline arrangement. Optionally, the one or more second switch elements comprise a plurality of second diodes each respectively connected across the slot.

Optionally, in plan view, the plurality of first diodes overlap with the feedline arrangement. Optionally, in plan view, the one or more second switch elements do not overlap with the feedline arrangement.

Optionally, the slot comprises a ring shaped slot. The ring shaped slot may be a rectangular-ring slot (square-ring slot), a rounded-ring slot (circular-ring slot), etc.

Optionally, the ring shaped slot (e.g., square-ring slot) includes: first and second slot portions arranged opposite to each other, and third and fourth slot portions arranged opposite to each other and extending between the first and second slot portions.

Optionally, in plan view, the square-ring slot defines a center and the parasitic element is offset from the center.

Optionally, the slot further comprises one or more open stubs connected with the ring shaped slot.

Optionally, the one or more open stubs comprises: a first open stub connected at or near an interface between the first and third slot portions and a second open stub arranged opposite to the first open stub and connected at or near an interface between the second and fourth slot portions. Optionally, the first and second open stubs elongate along the same axis.

Optionally, the one or more open stubs consists of (only) the first and second open stubs.

Optionally, in plan view, the slot is disposed within a footprint of the radiator arrangement, e.g., the dielectric radiator.

Optionally, the slot consists of the square-ring slot and the first and second open stubs.

Optionally, the feedline arrangement comprises a generally Y-shaped feedline arrangement.

Optionally, the generally Y-shaped feedline arrangement comprises: a first feedline portion with a generally elongated feedline, a second feedline portion with a generally elongated feedline connected at one end of the first feedline portion, and a third feedline portion connected at one end of the second feedline portion opposite to the first feedline portion. Optionally, the third feedline portion comprises two feedlines extending away from the second feedline portion and arranged at an angle to each other. The angle may be an acute angle, a right angle, or an obtuse angle less than 180 degrees.

Optionally, the generally Y-shaped feedline arrangement is generally symmetric about an axis. The axis may be an axis of symmetry of the switch elements. The axis may be perpendicular to an axis along with the first and second open stubs elongate.

Optionally, the two feedlines of the third feedline portion are end-shorted microstrip lines.

Optionally, the generally elongated feedline of the first feedline portion and the generally elongated feedline of the second feedline portion are generally coaxial. Optionally, the generally elongated feedline of the first feedline portion is narrower (in a direction perpendicular to the coaxial direction) than the generally elongated feedline of the second feedline portion.

Optionally, the plurality of first diodes of the switch arrangement comprise: a first diode connected to one of the two feedlines of the third feedline portion of the generally Y-shaped feedline arrangement, and a second diode connected to another one of the two feedlines of the third feedline portion of the generally Y-shaped feedline arrangement.

Optionally, the plurality of second diodes of the switch arrangement comprise: first and second diodes each connected across the second slot portion, third and fourth diodes each connected across the third slot portion, and a fifth diode connected across the slot at an interface between the first and fourth slot portions. Optionally, in plan view, the first and second diodes are disposed in an angular space defined between the first and second feedline portions and one of the two feedlines of the third feedline portion. Optionally, in plan view, the third and fourth diodes are disposed in an angular space defined between the first and second feedline portions and another one of the two feedlines of the third feedline portion. Optionally, in plan view, the fifth diode is disposed in an angular space defined between the two feedlines of the third feedline portion.

Optionally, the antenna further comprises a control circuit operably connected with the switch arrangement for controlling its operation hence operation mode of the antenna. For example, the control circuit may control ON and OFF of the switch elements in the switch arrangement.

In a second aspect of the invention, there is provided an electrical or electronic device comprising one or more of the antennas of the first aspect. The electrical or electronic device may be a communication device such as a router (e.g., Wi-Fi router), an IoT device, etc.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree or relative terminologies such that "generally", "about", "approximately", "substantially", etc., in connection with a quantity or a condition, are, depending on context, used to take into account at least one of: manufacture tolerance, degradation, assembly, use, trend, tendency, practical applications, etc. In some examples, the relative terminology may refer to plus or minus a percentage (e.g., 1%, 5%, 10%, 15%, or 20%) of an indicated value.

As used herein, the expression "broadside radiation pattern" may refer to a generally broadside radiation pattern, the expression "omnidirectional radiation pattern" may refer to a generally omnidirectional radiation pattern, the expression "unilateral radiation pattern" may refer to a generally unilateral radiation pattern. It should be appreciated that in practice strictly broadside, strictly omnidirectional, and strictly unilateral radiation patterns are difficult if not impossible to obtain. In some cases, the radiation patterns provided by the antenna may be further modified by the environment in which the antenna is arranged (e.g. object(s) near the antenna).

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Inventors of the invention have devised, through research, experiments, and/or trials, that broadside, omnidirectional, and unilateral radiation patterns can all be used in wireless communication systems.

Figure 17:
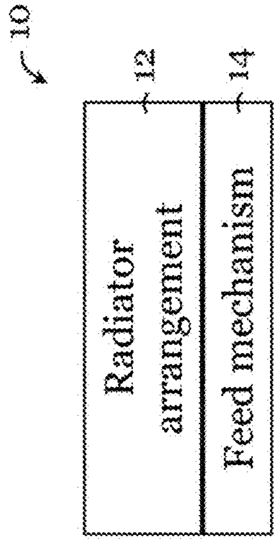
FIG. 17 is a high-level block diagram of an antenna in one embodiment.

FIG. 17 illustrates a functional block diagram of an antenna 10 of the invention. The antenna 10 is a pattern reconfigurable antenna that can selectively provide three or more different radiation patterns, e.g., broadside, omnidirectional, and unilateral radiation patterns. The antenna 10 generally includes, among other things, a radiator arrangement 12 and a feed mechanism 14 operably coupled with the radiator arrangement 12. The feed mechanism 14 is operable to affect operation of the radiator arrangement. Specifically the feed mechanism 14 is configured to selectively operate in at least three different states. When the feed mechanism 14 operates in a first state, the antenna 10 operates in a first mode to provide a broadside radiation pattern. When the feed mechanism 14 operates in a second state, the antenna 10 operates in a second mode to provide an omnidirectional radiation pattern. When the feed mechanism 14 operates in a third state, the antenna 10 operates in a third mode to provide a unilateral radiation pattern. In practice, the broadside radiation pattern is a generally broadside radiation pattern, the omnidirectional radiation pattern is a generally omnidirectional radiation pattern, and the unilateral radiation pattern is a generally unilateral radiation pattern. In some embodiments, the antenna 10 can operate at substantially the same frequency, or frequency band, in some of all of the first mode, the second mode, and the third mode. In some embodiments, some or all of the broadside radiation pattern, the omnidirectional radiation pattern, and the unilateral radiation pattern have substantially the same polarization. In some embodiments, some or all of the broadside radiation pattern, the omnidirectional radiation pattern, and the unilateral radiation pattern have a generally vertically polarized electric field. In some embodiments, the third mode is based on a combination of the second mode and the first mode, i.e., the unilateral radiation pattern is based on a combination of the broadside radiation pattern and the omnidirectional radiation pattern.

Figure 1A:
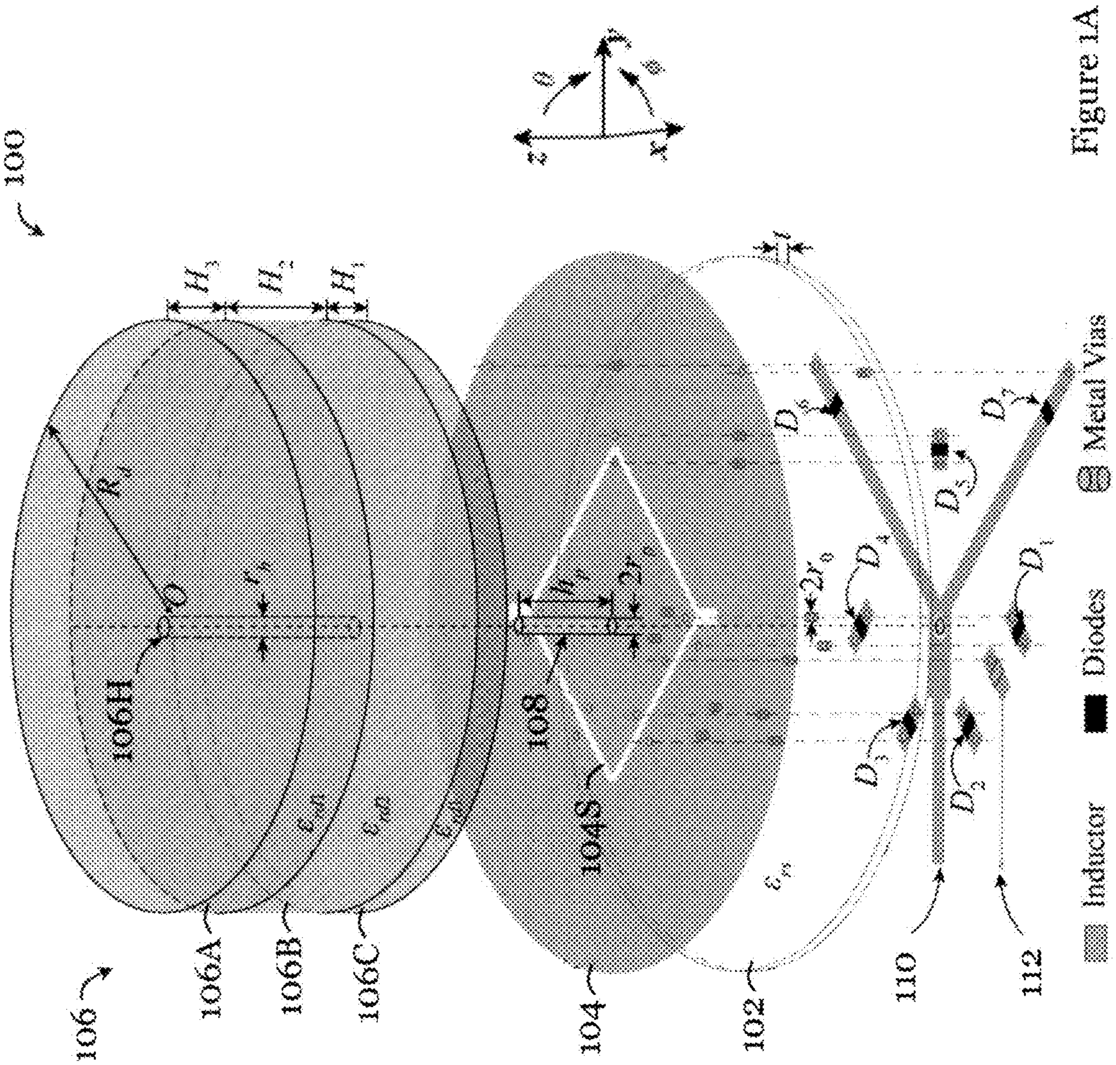
FIG. 1A is an exploded view of an antenna in one embodiment.
Figure 1B:
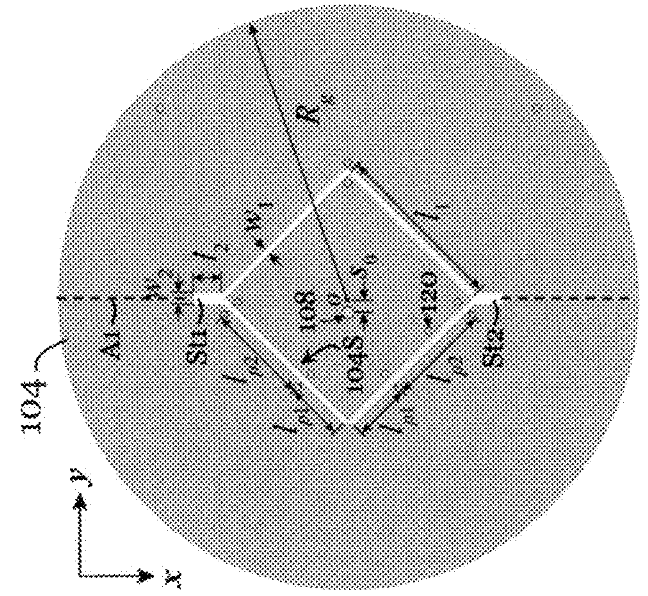
FIG. 1B is a top view of the ground plane of the antenna in FIG. 1A.
Figure 1C:
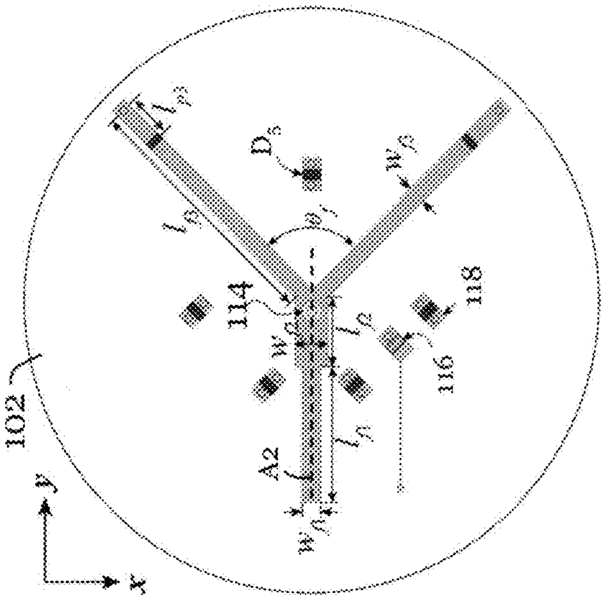
FIG. 1C is a bottom view of the substrate of the antenna in FIG. 1A.

FIGS. 1A to 1C illustrate an antenna 100 in one embodiment of the invention. The antenna 100 can be considered as an example implementation of the antenna 10. The antenna 100 is a pattern reconfigurable antenna that can selectively provide broadside, omnidirectional, and unilateral radiation patterns.

The antenna 100 generally includes a substrate 102 in the form of a circular disc with dielectric constant $\varepsilon_{rs}$, radius $R_9$, and thickness t, and a circular ground plane 104 arranged on one (top) side of the substrate 102 and with substantially the same radius as the substrate 102. The substrate 102 may be a PCB substrate. The antenna 100 also includes a radiator arrangement arranged at least partly on the ground plane 104, and a feed mechanism arranged at least partly on the ground plane 104 and the substrate 102 and operably coupled with the radiator arrangement for affecting its operation.

In this embodiment, the radiator arrangement includes a dielectric resonator 106 arranged on the ground plane 104 and a parasitic element 108 directly connected with the ground plane 104. In plan view, the ground plane 104 occupies a larger footprint than the dielectric resonator 106. The dielectric resonator 106 is arranged generally centrally of the ground plane 104. The dielectric resonator 106 includes a generally cylindrical body with radius $R_d$. A generally cylindrical hole 106H that receives the parasitic element 108 is formed in the generally cylindrical body. The generally cylindrical body of the dielectric resonator defines a central axis along an axial direction (at center O, perpendicular to the ground plane) and the hole 106H extends along an axis offset from and parallel to the central axis. In this embodiment, the hole 106H is a generally cylindrical through-hole with diameter $r_h$. In this embodiment, the dielectric resonator 106 includes three portions or layers, one arranged on top another. Specifically, the dielectric resonator 106 includes a lower cylindrical portion 106A with radius $R_d$ and height H1 arranged on the ground plane 104, a middle cylindrical portion 106B with radius $R_d$ and height H2 arranged on the lower cylindrical portion 106A, and a upper cylindrical portion 106C with radius $R_d$ and height H3 arranged on the middle cylindrical portion 106B. The upper cylindrical portion 106C is arranged to facilitate the providing of the unilateral radiation pattern. The lower cylindrical portion 106A is arranged to facilitate impedance matching between the ground plane 104 and the dielectric resonator 106. In this embodiment, the upper cylindrical portion 106C and the lower cylindrical portion 106A both have the same dielectric constant $\varepsilon_{rd1}$ and the middle cylindrical portion 106B has a dielectric constant $\varepsilon_{rd2}$. Dielectric constant $\varepsilon_{rd2}$ is larger than dielectric constant $\varepsilon_{rd1}$, e.g., by at least 2 or 2.5 times. In this embodiment, the heights H1, H2, and H3 are different, with H2 larger than H3 (e.g., by at least 1.25 or 1.5 times) and H3 larger than H1 (e.g., by at least 1.5, 1.75, or 2 times). In this example, heights H1, H2, and H3 are in the ratio of 1:3:2 (H1:H2:H3).

As illustrated in FIG. 1A, the parasitic monopole or parasitic element 108 in this embodiment is in the form of a cylindrical probe, with height $h_p$ and radius $r_p$, extending perpendicular to the ground plane 104 or substrate 102. The parasitic element 108 extends through the substrate 102, is connected with (e.g., soldered to) the ground plane 104, and is arranged inside and centrally of the hole 106H of the dielectric resonator 106. In this embodiment the upper end of the parasitic element 108 terminals in the hole 106H portion defined by the middle cylindrical portion 106B. In this embodiment, in plan view, the ground plane 104 defines a center O and the parasitic element 108 is offset from the center O.

In this embodiment, the dielectric resonator 106 can facilitate operation of the antenna as a dielectric resonator antenna and the parasitic element 108 can facilitate operation of the antenna as a parasitic monopole antenna. The dielectric resonator antenna can be considered as being loaded by the parasitic monopole antenna.

In this embodiment, the feed mechanism of the antenna 100 includes a slot 104S formed in the ground plane 104, a feedline arrangement 110 arranged on the side of the substrate 102 opposite to the ground plane 104, and a switch arrangement operably connected with the feedline arrangement 110 and the slot 104S for selectively affecting operation of the feedline arrangement 110 and the slot 104S hence the operation mode of the antenna 100.

Referring to FIGS. 1A and 1B, in this embodiment, the slot 104S is disposed within a footprint of the dielectric resonator 106 in plan view. The slot 104S includes a square-ring slot and two open stubs St1, St2. The square-ring slot includes two elongated slot portions arranged opposite to each other with length $l_1$ and width $w_1$, and another two elongated slot portions arranged opposite to each other with length $l_1$ and width $w_1$ and extending between the two elongated slot portions. The two open stubs St1, St2 are connected at opposite corners of the square-ring slot and they both elongate along the axis A1 (in the x-direction). Each of the open stub includes a length $l_2$ and a width $w_2$. As best shown in FIG. 1B, in plan view, the square-ring slot defines a center O and the parasitic element 108 is surrounded by the square-ring slot and is offset from the center O by an offset distance so.

Referring now to FIGS. 1A and 1C, in this embodiment, the feedline arrangement 110 includes a generally Y-shaped feedline arrangement, which is generally symmetric about an axis A2 (in the y-direction). The generally Y-shaped feedline arrangement 110 can be divided into three portions. The first portion includes a generally elongated 50Ω transmission line having length $l_{f1}$ and width $w_{f1}$. The second portion includes a generally elongated feedline connected with the feedline of the first portion. The feedline of the second portion is introduced to improve the matching of the antenna, and it has a length $l_{f2}$ and a width $w_{f2}$. The feedline of the first portion and the feedline of the second portion are generally coaxial and extending along axis A2. The third portion includes two end-shorted microstrip lines extending away from the feedline of the second portion and arranged at an angle θf to each other. Each of the two end-shorted microstrip lines has a length $l_{f3}$ and a width $w_{f3}$. A small annular guard ring 114 is arranged in the feedline of the second portion to avoid contact between the parasitic monopole 108 and the feedline.

Referring to FIGS. 1A and 1C, in this embodiment, the switch arrangement includes multiple diodes operably coupled with the feedline arrangement 110 and the slot 104S. Particularly, the diodes are placed on the side of the substrate with the feedline arrangement 110, and on a solder pad 118, and are each connected to the ground plane 104 through respective metallic vias 120 (see FIG. 1B). The diodes are symmetrically disposed about axis A2 and can be divided into two groups: Group 1 ($D_1$, $D_2$, $D_3$, $D_4$, and D) and Group 2 ($D_6$ and $D_7$). The diodes in Group 1 ($D_1$, $D_2$, $D_3$, $D_4$, and $D_5$) are soldered across the slot 104S.

The diodes in Group 1 ($D_1$, $D_2$, $D_3$, $D_4$, and $D_5$) includes diodes $D_1$, $D_2$ connected across one of the elongated slot portion of the square-ring shaped slot, diodes $D_3$, $D_4$ connected across an adjacent one of the elongated slot portion of the square-ring shaped slot, and a diode $D_5$ connected across the a corner of the square-ring slot away from the diodes $D_1$, $D_2$, $D_3$, $D_4$. As best shown in FIG. 1A, in plan view, diodes $D_1$, $D_2$ are disposed in an angular space defined between the first and second portions of the feedline arrangement 110 and one of the two end-shorted microstrip lines of the third portion of the feedline arrangement 110; diodes $D_3$, $D_4$ are disposed in an angular space defined between the first and second portions of the feedline arrangement 110 and another one of the two end-shorted microstrip lines of the third portion of the feedline arrangement 110; and diode $D_5$ is disposed in an angular space defined between the two end-shorted microstrip lines of the third portion of the feedline arrangement 110. The diodes in Group 2 ($D_6$ and $D_7$) are directly soldered to the Y-shaped feedline arrangement 110. One of the diode D6 is arranged on one of the end-shorted microstrip lines of the third portion of the generally Y-shaped feedline arrangement 110, at a position of $l_{p3}$ from the shorting vias near the end of the microstrip line. Another one of the diode D& is arranged on another one of the end-shorted microstrip lines of the third portion of the generally Y-shaped feedline arrangement 110, at a position of $l_{p3}$ from the shorting vias near the end of the microstrip line. In this embodiment, the diodes are NXP BAP55LX pin diodes (and their SPICE models are used in the simulation experiments below).

As shown in FIG. 1A, the antenna 100 further comprises a control circuit operably coupled with the switch arrangement for controlling operation of the switch arrangement hence operation mode of the antenna. For example, the control circuit may selectively control ON and OFF of the diodes $D_1$, $D_2$, $D_3$, $D_4$, $D_5$, $D_6$, and $D_7$ in the switch arrangement. The control circuit may include a biasing circuit 112 including an inductor 116 operably coupled with the Group 1 diodes for controlling their operations and a bias tee for operably coupled with the Group 2 diodes for controlling their operation.

Table I lists the values of the various parameters used in the antenna 100 embodiment. It should be appreciated that in other embodiments, these values may be different or irrelevant.

TABLE I

Design parameters of the antenna 100

| $R_d$ | $R_g$ | $r_o$ | $r_h$ | $r_p$ | $H_1$ | $H_2$ |
|---|---|---|---|---|---|---|
| 24.8 mm | 33.5 mm | 0.15 mm | 1.4 mm | 0.9 mm | 4 mm | 12 mm |
| $H_3$ | $h_p$ | $w_1$ | $w_2$ | $w_{f1}$ | $w_{f2}$ | $w_{f3}$ |
| 8 mm | 11.5 mm | 1 mm | 1.41 mm | 1.8 mm | 3.2 mm | 1.3 mm |
| $l_1$ | $l_2$ | $l_{f1}$ | $l_{f2}$ | $l_{f3}$ | $l_{p1}$ | $l_{p2}$ |
| 19 mm | 3 mm | 8 mm | 7.7 mm | 30.9 mm | 6.4 mm | 11.3 mm |
| $l_{p3}$ | $s_o$ | t | $\varepsilon_{rd1}$ | $\varepsilon_{rd2}$ | $\varepsilon_{rs}$ | $\theta_f$ |
| 6.3 mm | 1 mm | 0.813 mm | 2.9 | 7.8 | 3.38 | 90° |

The antenna 100 is a pattern-reconfigurable antenna that can switch between the broadside, omnidirectional, and unilateral radiation modes. As mentioned the antenna 100 includes a Y-shaped microstrip line arrangement 110, a slot 104S with a feeding square-ring slot, and a parasitic monopole antenna (with parasitic element 108) loaded by a three-layer cylindrical dielectric resonator antenna (with dielectric resonator 106). In this embodiment, the slot 104S fed by the Y-shaped microstrip line 110 can excite the fundamental HEM11+δ dielectric resonator antenna mode and the slot 104S can resonate to provide a radiating slot mode. Both the HEM11+δ mode and the slot mode have broadside radiation patterns, which are used together in the broadside radiation mode of the antenna 100. The parasitic monopole 108 is used to provide the omnidirectional radiation mode. When the broadside radiation mode and the omnidirectional radiation mode are operated simultaneously, their radiation fields can be superimposed to give a unilateral radiation pattern to provide a unilateral radiation mode. The diodes $D_1$, $D_2$, $D_3$, $D_4$, $D_5$, $D_6$, and $D_7$ in the switch arrangement are used in the feedline arrangement 110 to switch between the three operation states.

Figure 2A:
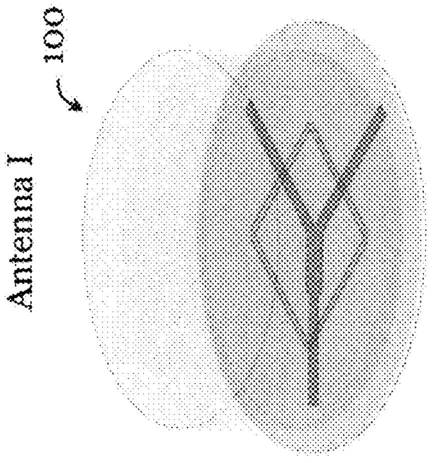
FIG. 2A is a schematic diagram of the antenna of FIG. 1A in a first configuration/mode ("Antenna I")
Figure 2B:
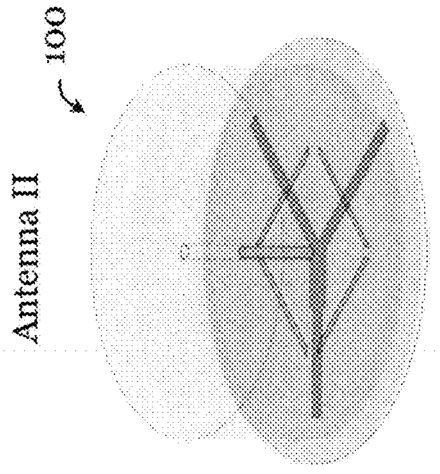
FIG. 2B is a schematic diagram of the antenna of FIG. 1A in a second configuration/mode ("Antenna II")
Figure 2C:
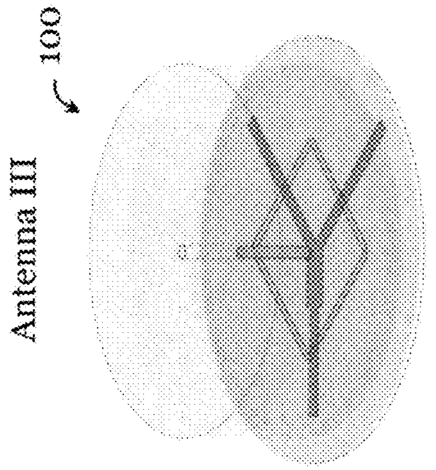
FIG. 2C is a schematic diagram of the antenna of FIG. 1A in a third configuration/mode ("Antenna III")

FIGS. 2A to 2C illustrate three reference antennas ("Antenna I", "Antenna II", "Antenna III") that correspond to the antenna 100 at different operation (e.g., radiation) modes. In FIG. 2A, the antenna 100 is in a first configuration/mode ("Antenna I") to provide a broadside radiation pattern. In FIG. 2B, the antenna 100 is in a second configuration/mode ("Antenna II") to provide an omnidirectional radiation pattern. In FIG. 2C, the antenna 100 is in a third configuration/mode ("Antenna III") to provide a unilateral radiation pattern. Specifically, Antenna I corresponds to a three-layer cylindrical dielectric resonator antenna fed by the square-ring slot which can also resonate at its slot frequency. Antenna I is operated in State I to provide a broadside radiation pattern. Antenna II corresponds to a three-layer cylindrical dielectric resonator loaded by a parasitic monopole, excited by four disconnected slots in the ground plane. Antenna II is operated in State II to provide a conical (monopolar) radiation pattern. In this configuration, the disconnected slots are obtained from the square-ring slot by turning on the diodes at the disconnected positions. Antenna III corresponds to Antenna I loaded by a parasitic monopole. Antenna III is operated in State III to provide a unilateral radiation pattern. In each of these three cases, the feedline arrangements and slots are finely adjusted to match the antenna. In Antennas II and III, the parasitic monopole is considered to be connected to the ground.

Figure 3A:
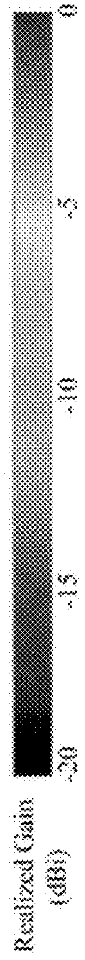
FIG. 3A is a diagram showing simulated normalized 3D radiation pattern of the antenna of FIG. 1A in the first configuration/mode ("Antenna I") at 2.4 GHz.
Figure 3A:
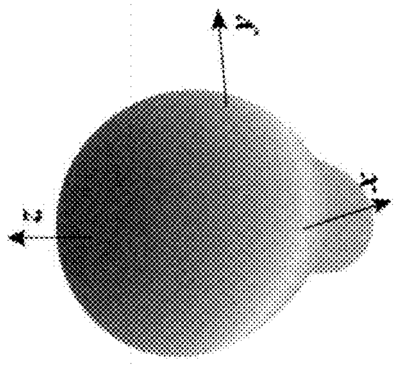
Figure 3B:
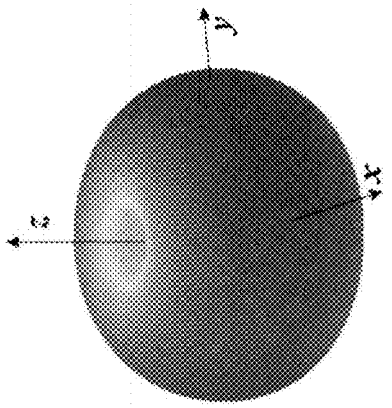
FIG. 3B is a diagram showing simulated normalized 3D radiation pattern of the antenna of FIG. 1A in the second configuration/mode ("Antenna II") at 2.4 GHz.
Figure 3C:
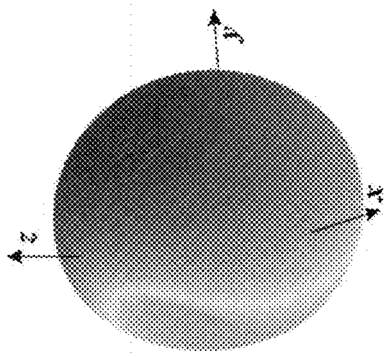
FIG. 3C is a diagram showing simulated normalized 3D radiation pattern of the antenna of FIG. 1A in the third configuration/mode ("Antenna III") at 2.4 GHz.

FIGS. 3A to 3C illustrate simulated normalized 3D radiation patterns of three reference antennas in FIGS. 2A to 2C (correspond to the antenna 100 at different operation (e.g., radiation) modes) at 2.4 GHz.

Figure 4:
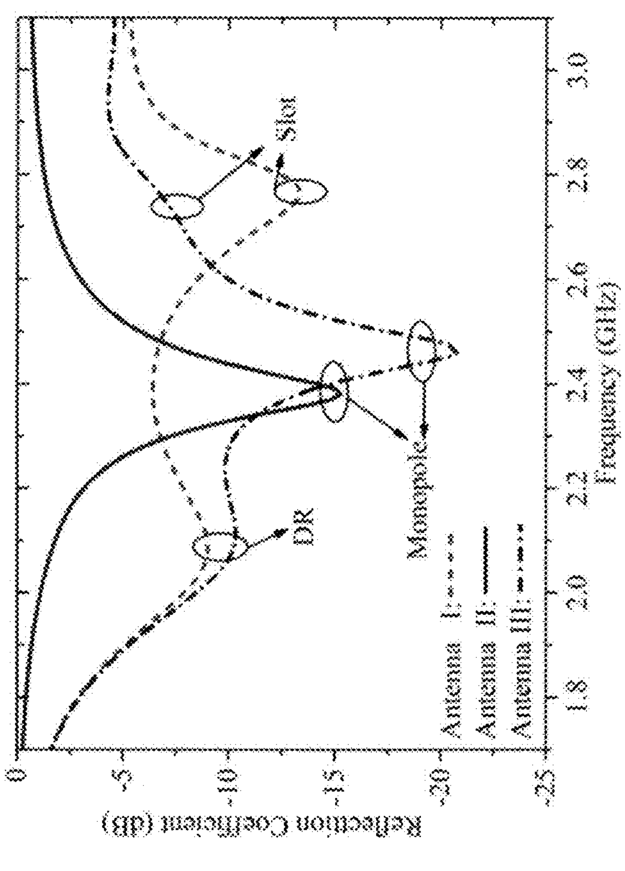
FIG. 4 is a graph showing simulated reflection coefficients of the antenna of FIG. 1A in the three different configurations/modes ("Antenna I", "Antenna II", and "Antenna III")

FIG. 4 shows the simulated reflection coefficients (dB) of the three reference antennas ("Antenna I", "Antenna II", "Antenna III"), which corresponds to the antenna 100 at different operation (e.g., radiation) modes. As shown in FIG. 4, Antenna I is excited in its broadside dielectric resonator antenna mode ($HEM_{11\delta}$) and slot mode. For Antenna II, only a single conical mode can be observed and this resonance mode is mainly due to parasitic monopole (not the dielectric resonator antenna or the disconnected slots, as verified by a parametric study). Antenna III can be considered as a combination of Antennas I and II, and thus, all of the resonant modes in Antennas I and II can be found in Antenna III. Antenna III provides a unilateral radiation pattern.

Figure 5A:
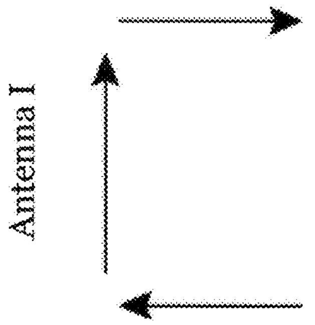
FIG. 5A is a schematic illustration of a model illustrating the radiation pattern of the antenna of FIG. 1A in the first configuration/mode ("Antenna I")
Figure 5B:
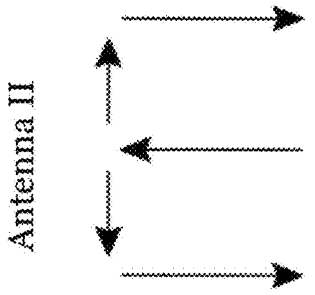
FIG. 5B is a schematic illustration of a model illustrating the radiation pattern of the antenna of FIG. 1A in the second configuration/mode ("Antenna II")
Figure 5C:
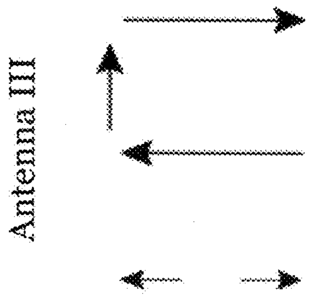
FIG. 5C is a schematic illustration of a model illustrating the radiation pattern of the antenna of FIG. 1A in the third configuration/mode ("Antenna III")

FIGS. 5A to 5C illustrate respective models representing the ideal radiation patterns of the reference antennas ("Antenna I", "Antenna II", "Antenna III"), which corresponds to the antenna 100 at different operation (e.g., radiation) modes. As shown in FIGS. 5A to 5C, a superposition of the radiation fields in Antennas I and II (States I and II) will result in some fields being canceled and some fields being strengthened, thereby providing the unilateral radiation pattern in Antenna III (State III).

The operation states of antenna 100 can be manipulated by selectively activating the diodes $D_1$, $D_2$, $D_3$, $D_4$, $D_5$, $D_6$, and $D_7$ in the switch arrangement.

Figure 6A:
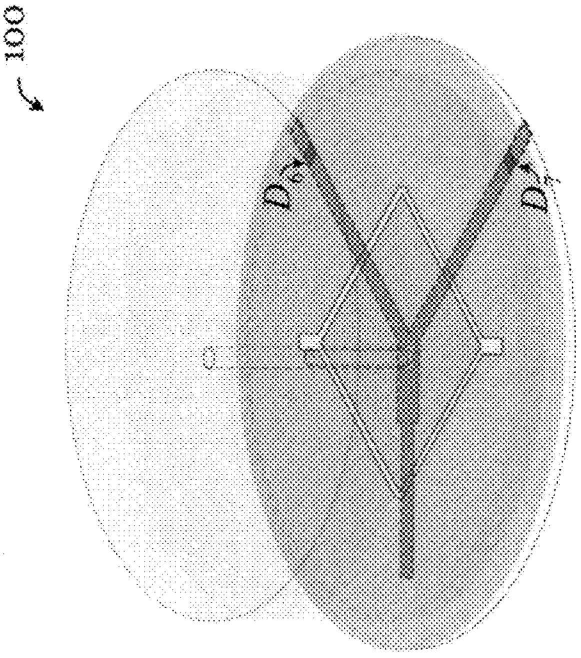
FIG. 6A is a schematic illustration of an effective configuration of the antenna of FIG. 1A in the first configuration/mode ("Antenna I") at 2.45 GHz (only the diodes that are turned on are illustrated)
Figure 6B:
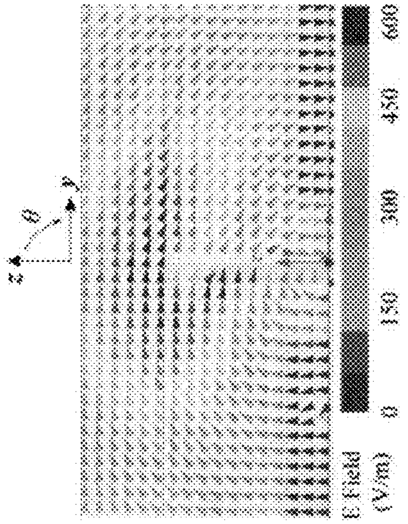
FIG. 6B is a plot of the corresponding electric field distribution (y-z plane) in the antenna ("Antenna I") at 2.45 GHz.

FIGS. 6A and 6B illustrate an effective configuration of the antenna 100 in the first configuration/mode ("Antenna I") at 2.45 GHz and the corresponding electric field distribution (y-z plane). This first configuration/mode corresponds to a broadside mode (which generates broadside radiation pattern). In this mode, the Group 1 diodes $D_1$, $D_2$, $D_3$, $D_4$, and $D_5$ connected across the slot 104S are all OFF, and the Group 2 diodes $D_6$ and $D_7$ soldered to the Y-shaped feedline arrangement 110 are all ON. FIG. 6A only shows the turned-on diodes. It is found that by turning on the diodes $D_6$ and $D_7$ on the Y-shaped feedline arrangement 110, the equivalent magnetic slot current has no net rotational components, thus suppressing the omnidirectional mode (State II) of the antenna. FIG. 6B shows the simulated E-field inside the antenna 100 and it can be seen that the field is of a broadside radiation pattern.

Figure 7B:
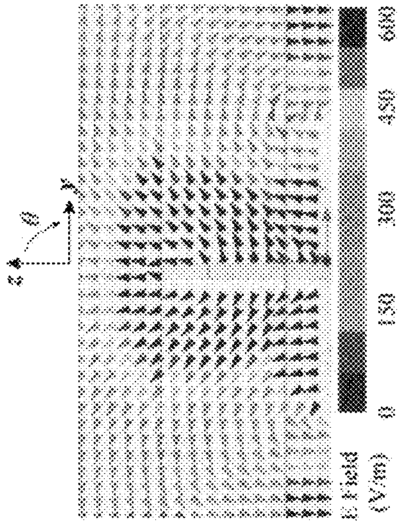
FIG. 7B is a plot of the corresponding electric field distribution (y-z plane) in the antenna ("Antenna II") at 2.45 GHz.
Figure 7A:
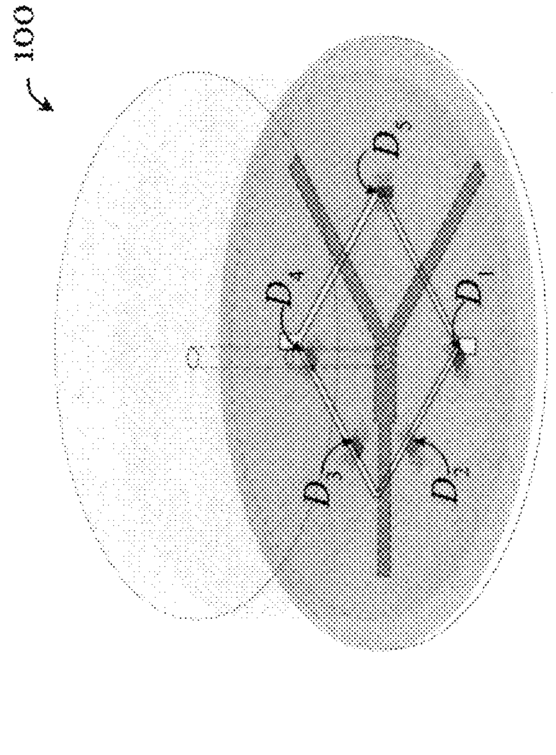
FIG. 7A is a schematic illustration of an effective configuration of the antenna of FIG. 1A in the second configuration/mode ("Antenna II") at 2.45 GHz (only the diodes that are turned on are illustrated)

FIGS. 7A and 7B illustrate an effective configuration of the antenna 100 in the second configuration/mode ("Antenna II") at 2.45 GHz and the corresponding electric field distribution (y-z plane). This second configuration/mode corresponds to an omnidirectional mode (which generates omnidirectional radiation pattern). In this mode, the Group 1 diodes $D_1$, $D_2$, $D_3$, $D_4$, and $D_5$ connected across the slot 104S are all ON, and the Group 2 diodes $D_6$ and $D_7$ soldered to the Y-shaped feedline arrangement 110 are all OFF. FIG. 7A only shows the turned-on diodes. By turning on the diodes $D_1$, $D_2$, $D_3$, $D_4$, and $D_5$, the square-ring slot is effectively divided into four disconnected slot sections, thus suppressing the broadside dielectric resonator antenna and slot modes. Also, it is found that turning off the diodes $D_6$ and $D_7$ can enable a rotational magnetic slot current that efficiently couples energy to the parasitic monopole 108, thus provide the omnidirectional mode of thee antenna 100. A parametric study of this resonance mode is performed and it has been determined that the resonance here is caused by the parasitic monopole instead of the slot. FIG. 7B shows that the simulated E-field distribution inside the antenna 100 is consistent with the monopolar field.

Figure 8B:
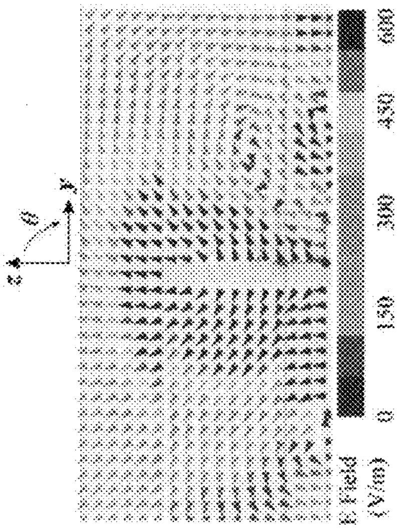
FIG. 8B is a plot of the corresponding electric field distribution (y-z plane) in the antenna ("Antenna III") at 2.45 GHz.
Figure 8A:
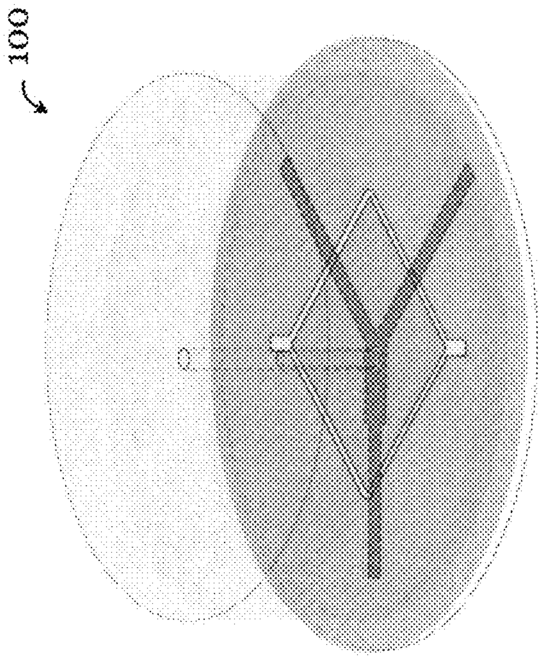
FIG. 8A is a schematic illustration of an effective configuration of the antenna of FIG. 1A in the third configuration/mode ("Antenna III") at 2.45 GHz (all diodes are turned off hence not illustrated)

FIGS. 8A and 8B illustrate an effective configuration of the antenna 100 in the third configuration/mode ("Antenna III") at 2.45 GHz and the corresponding electric field distribution (y-z plane). This third configuration/mode corresponds to a unilateral mode (which generates unilateral radiation pattern). In this mode, all of the diodes $D_1$, $D_2$, $D_3$, $D_4$, $D_5$, $D_6$, and $D_7$ are OFF and hence no diodes are shown in FIG. 8A. As the diodes $D_6$ and $D_7$ on the Y-shaped feedline arrangement 110 are off, the magnetic slot current has a net rotational component and therefore does not suppress the omnidirectional mode. On the other hand, with the diodes $D_1$, $D_2$, $D_3$, $D_4$, and $D_5$ connected across the slot 104S turned off, the magnetic slot current is no longer disconnected. As a result, the broadside mode is also not suppressed. In other words, both the broadside and omnidirectional modes can be excited, and their fields superimpose each other to give a unilateral radiation pattern. FIG. 8B shows the simulated internal E-field distribution of the antenna 100. As shown in FIG. 8B, the E-field on the left-hand side has upward and downward field components. These two components cancel each other and weaken the left-hand-side radiation field. In contrast, the E-field on the right-hand side has no field cancellation. Consequently, the field can be effectively radiated to the right to provide a unilateral radiation pattern.

Table II summarizes the ON/OFF states of the diodes $D_1$, $D_2$, $D_3$, $D_4$, $D_5$, $D_6$, and $D_7$ in the three operation modes.

TABLE II

Diodes and pattern reconfigurability of the antenna 100

| State/Mode | Radiation Patterns | Group 1 diodes ($D_1$, $D_2$, $D_3$, $D_4$, $D_5$) | Group 2 diodes ($D_6$, $D_7$) |
|---|---|---|---|
| I | Broadside | OFF | ON |
| II | Omnidirectional | ON | OFF |
| III | Unilateral | OFF | OFF |

Figure 9:
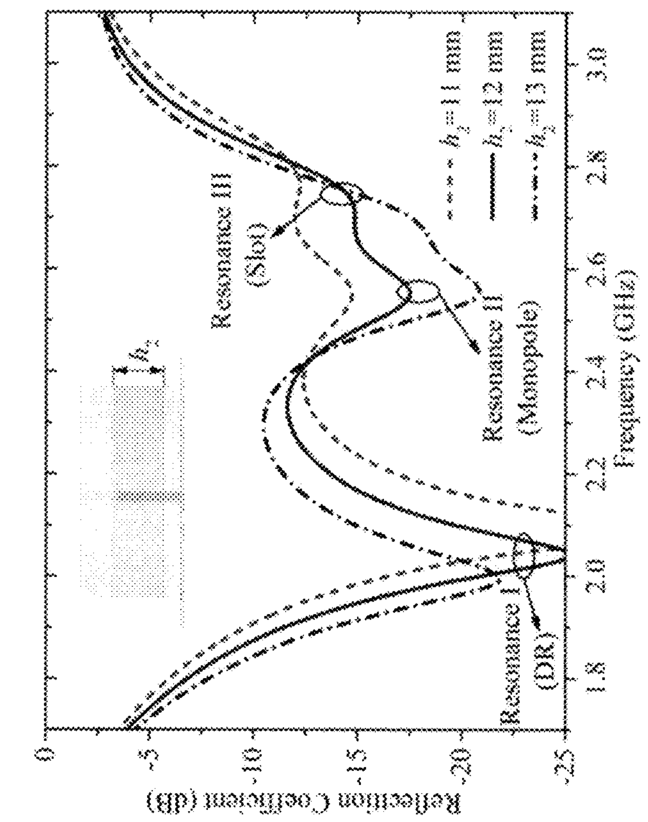
FIG. 9 is a graph showing radiation coefficients (dB) at different frequencies for different heights $h_2$ of the middle portion of the dielectric resonator of the antenna of FIG. 1A in the first configuration/mode ("Antenna I")
Figure 10:
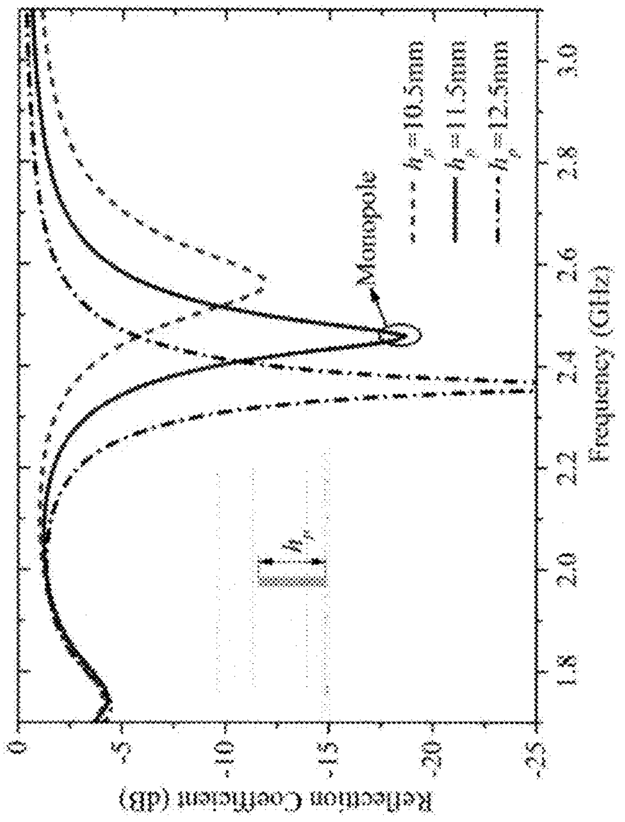
FIG. 10 is a graph showing radiation coefficients (dB) at different frequencies for different heights $h_p$ of the monopole of the antenna of FIG. 1A in the second configuration/mode ("Antenna II")
Figure 11:
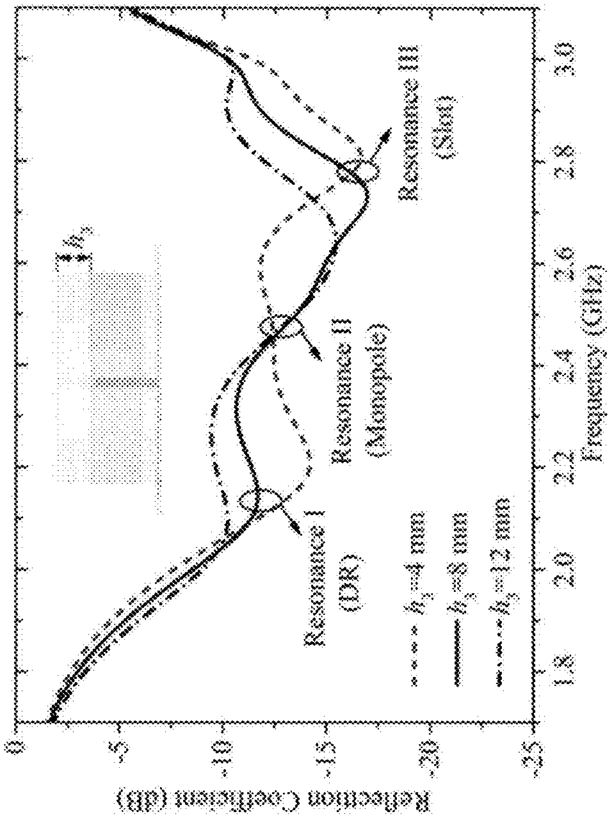
FIG. 11 is a graph showing the radiation coefficients (dB) at different frequencies for different heights $h_3$ of the top portion of the dielectric resonator of the antenna of FIG. 1A in the third configuration/mode ("Antenna III")

A parametric study is performed to characterize the antenna 100. FIGS. 9 to 11 show the results—the simulated reflection coefficient (dB) at different frequencies for different values of the monopole and dielectric resonator parameters in different states or modes.

First, the impact of the height $h_2$ of the middle cylindrical portion 106B of the dielectric resonator 106 on the antenna 100 operating in the broadside radiation mode is considered. As shown in FIG. 9, as $h_2$ increases, the frequency of Resonance I significantly decreases (since Resonance I is the dielectric resonator mode). Also, as $h_2$ increases, the frequency of Resonance II remains substantially unchanged because Resonance II is due to the parasitic monopole. Further, as $h_2$ increases, the frequency of Resonance III decreases. This is expected because increasing $h_2$ will increase the dielectric resonator size hence the dielectric loading.

Second, the impact of the height/length $h_p$ of the monopole 108 on the antenna 100 operating in the omnidirectional radiation mode is considered. As shown in FIG. 10, as $h_p$ increases, the resonance shifts to lower frequencies, which verifies that it is a monopole mode.

Third, the impact of the height $h_3$ of the upper cylindrical portion 106C of the dielectric resonator 106 on the antenna 100 operating in the unilateral radiation mode is considered. As shown in FIG. 11, as $h_3$ increases, the operating frequencies of both the dielectric resonator mode and the slot mode. As expected, the results are similar to those in FIG. 9.

Figure 12C:
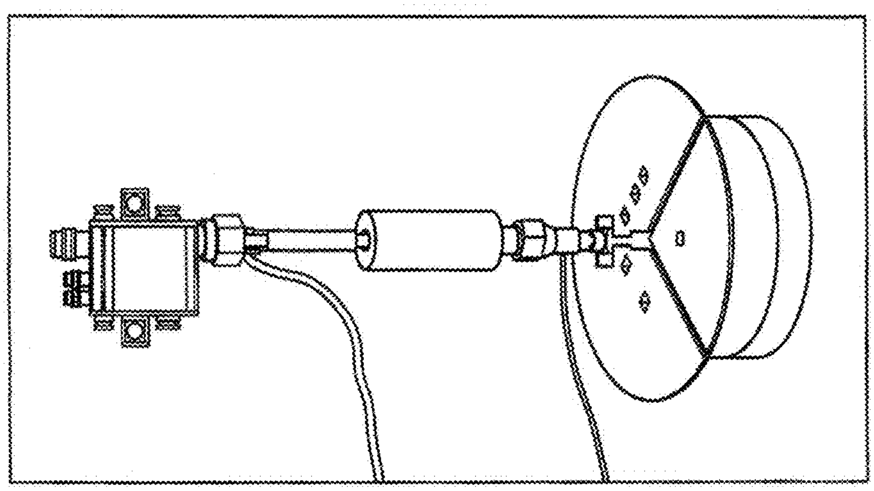
FIG. 12C is a picture of the antenna of FIG. 12A connected with other components at the other side of the substrate.
Figure 12B:
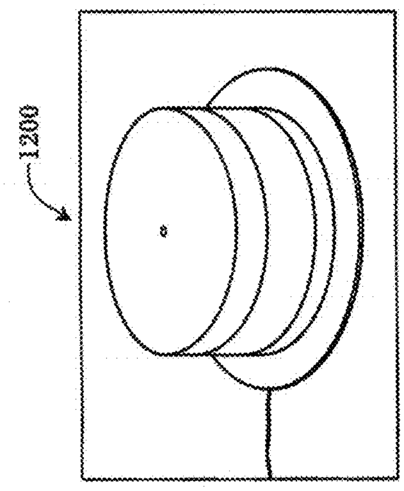
FIG. 12B is a picture of the antenna of FIG. 12A with the dielectric resonator placed on the substrate.
Figure 12A:
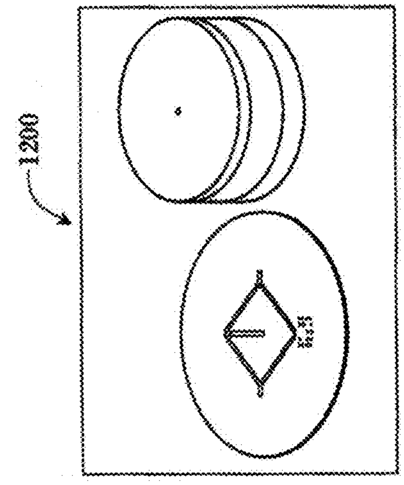
FIG. 12A is a picture of an antenna fabricated based on the design of FIG. 1A, with the dielectric resonator placed adjacent the substrate.

To further verify the simulation results, a prototype antenna 1200 as shown in FIGS. 12A to 12C is fabricated based on the design of the antenna 100, with the design parameters illustrated in Table 1. In FIG. 12A, the dielectric resonator is shown separately from the substrate and ground plane, to illustrate the square-ring slot formed on the ground plane. In FIG. 12B, the dielectric resonator is placed on the substrate and ground plane. This corresponds to the configuration of the antenna 1200 during operation. In FIG. 12C, the control circuit components, including coaxial cable, RF choke, and bias tee, are shown connected to the other side of the substrate opposite the ground plane. In this example, the dielectric resonator is fabricated using additive manufacturing methods although other manufacturing methods are also possible in other embodiments.

Experiments are performed to determine the performance of the antenna 1200. In the experiment, the biasing DC circuits of the Group 1 diodes are isolated from the antenna 1200 using a Murata LQW18AN51NG80D inductor and the Group 2 diodes are controlled and isolated by a Mini-Circuits ZX85-40W-63-S+ bias tee. An RF choke is used to reduce the undesirable return current on the outer conductor of the coaxial cable. The reflection coefficient is measured using an Agilent Vector Network Analyzer PNA 8753ES. The radiation patterns, realized gain, and total antenna efficiency (mismatch included) are measured with a Satimo StarLab system.

Figure 13:
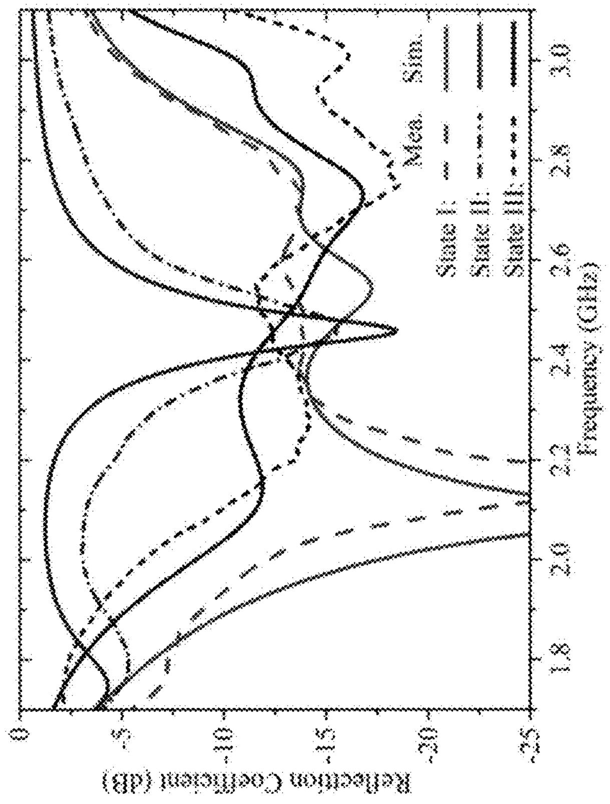
FIG. 13 is a graph showing measured and simulated reflection coefficients (dB) of the antenna of FIG. 12A in the first configuration/mode ("State I"), the second configuration/mode ("State II"), and the third configuration/mode ("State III")

FIG. 13 shows the measured and simulated reflection coefficients of the antenna 1200 operated in the three different states/modes (State I—broadside, State II—omnidirectional, State III—unidirectional). As shown in FIG. 13, reasonable agreement between the measured and simulated results is obtained. The −10 dB measured impedance bandwidths of the antenna 1200 in States I, II, and III are 38.3% (1.94 GHz to 2.86 GHz), 7.3% (2.37 GHz to 2.55 GHz), and 38.5% (2.1 GHz to 3.1 GHz), respectively. Their common bandwidth is 7.3% (2.37 GHz to 2.55 GHz), which covers the 2.4 GHz ISM band. As State II only has a monopole mode (without other modes), its impedance bandwidth is narrowest among the three states.

Figure 14A:
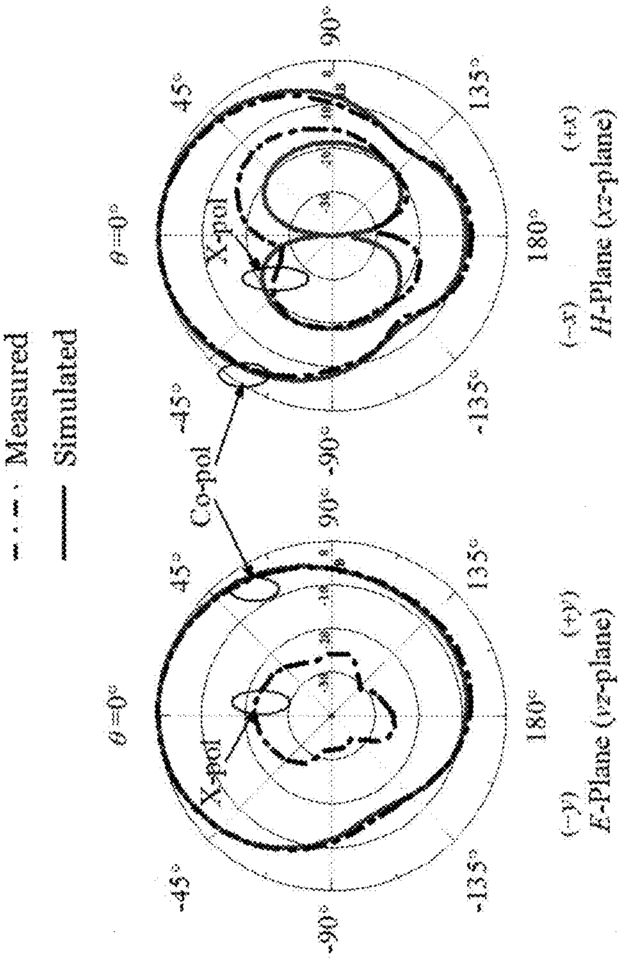
FIG. 14A is a plot showing simulated and measured normalized radiation patterns (E-plane and H-plane) of antenna of FIG. 12A in the first configuration/mode ("State I") at 2.45 GHz.
Figure 14B:
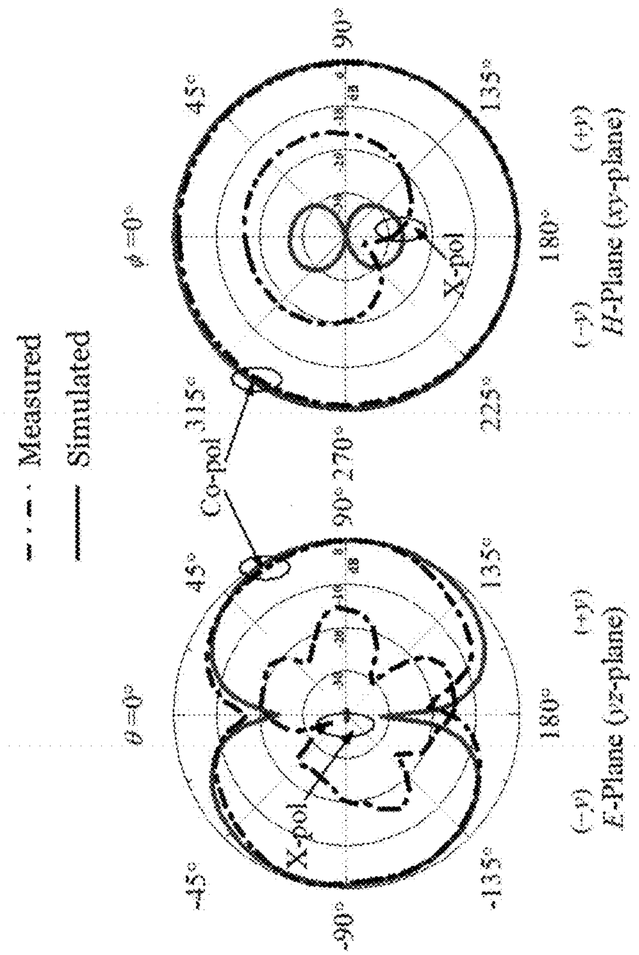
FIG. 14B is a plot showing simulated and measured normalized radiation patterns (E-plane and H-plane) of antenna of FIG. 12A in the second configuration/mode ("State II") at 2.45 GHz.
Figure 14C:
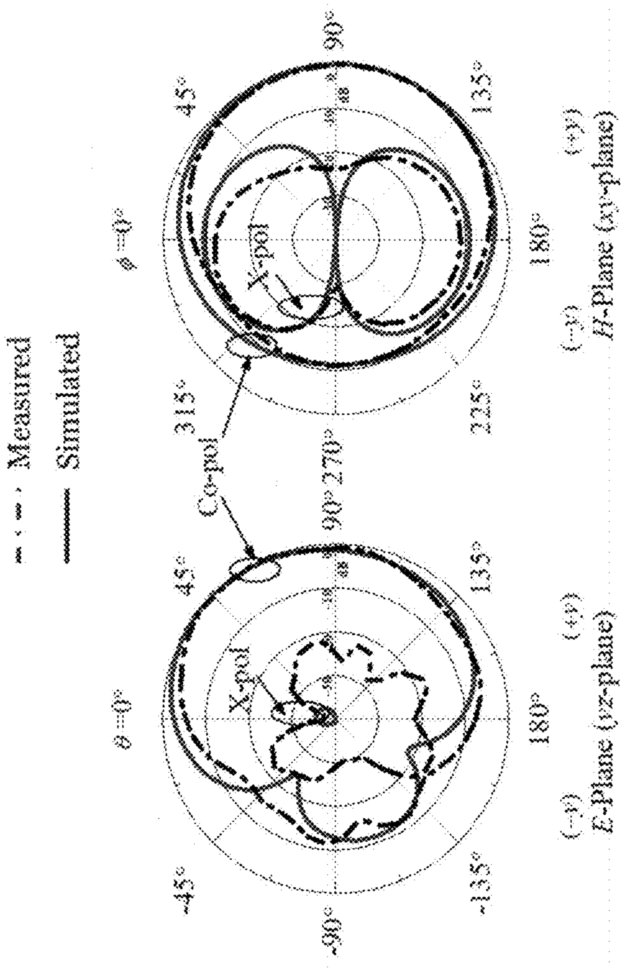
FIG. 14C is a plot showing simulated and measured normalized radiation patterns (E-plane and H-plane) of antenna of FIG. 12A in the third configuration/mode ("State III") at 2.45 GHz.

FIGS. 14A to 14C show the measured and simulated normalized radiation patterns (E-plane and H-plane) of the antenna 1200 in the three different states/modes (State I—broadside, State II—omnidirectional, State III—unidirectional).

FIG. 14A concerns State I. As shown in FIG. 14A, the antenna 1200 has broadside radiation patterns as expected. Its measured E- and H-plane 3 dB beamwidths are 93° (−42°≤θ≤51°) and 93° (−48°≤Θ≤45°), respectively. The asymmetrical E-plane radiation pattern is mainly caused by the offset (1 mm) of the monopole from the center of the dielectric resonator. In this embodiment, this offset is used to optimize the omnidirectional performance in State II. In the broadside direction, the measured cross-polar levels in the E- and H-planes are desirably low, both being lower than −21 dB.

FIG. 14B concerns State II. As shown in FIG. 14B, conical radiation patterns are obtained. The measured E- and H-plane 3 dB beamwidths are 111° (36°≤θ≤147°) and 360° (0°≤ϕ≤360°), respectively. It is found that the H-plane co-polar gain variation in this state is less than 1.5 dB. Due to experimental imperfections and tolerances, including for example wave reflections from the cables, the measured cross-polar fields are significantly stronger than the simulated results. Nevertheless, they are still much weaker than the co-polar counterparts, by at least 15 dB.

FIG. 14C concerns State III. As shown in FIG. 14C, the measured cross-polar fields are desirably weaker than the co-polar counterparts by more than −22 dB. The measured E- and H-plane 3 dB beamwidths are 102° (16° 0 18°) and 132° (30°≤162°), respectively.

Figure 15:
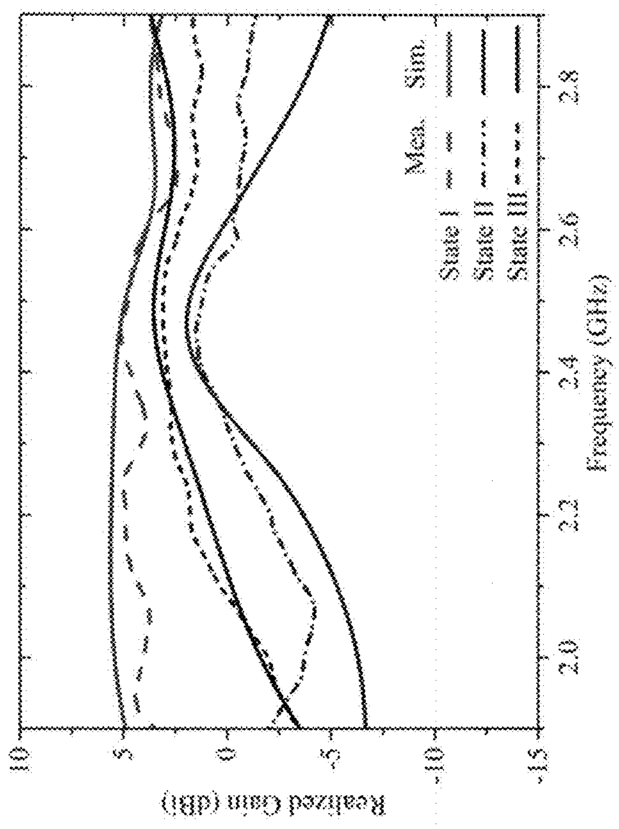
FIG. 15 is a graph showing measured and simulated realized gains (mismatch included) of the antenna of FIG. 12A in the first configuration/mode ("State I"), the second configuration/mode ("State II"), and the configuration/mode ("State III")

FIG. 15 shows the measured and simulated realized gains of the antenna 1200 (mismatch included) in the three different states/modes (State I—broadside, State II—omnidirectional, State III—unidirectional). As shown in FIG. 15, the measured gain in State I is higher than those of States II and III. This is mainly because State I has the smallest beamwidth among the three states. The measured average realized gains across the common bandwidth (2.37 GHz to 2.55 GHz) in States I, II, and III are 4.8 dBi, 1.17 dBi, and 3 dBi, with the peak values given by 5.18 dBi (2.45 GHz), 1.54 dBi (2.45 GHz), and 3.12 dBi (2.48 GHz), respectively. On average, the measured gains are −0.5 dB lower than the simulated results due to experimental tolerances and power losses caused by various antenna components such as the diodes, cables, etc.

Figure 16:
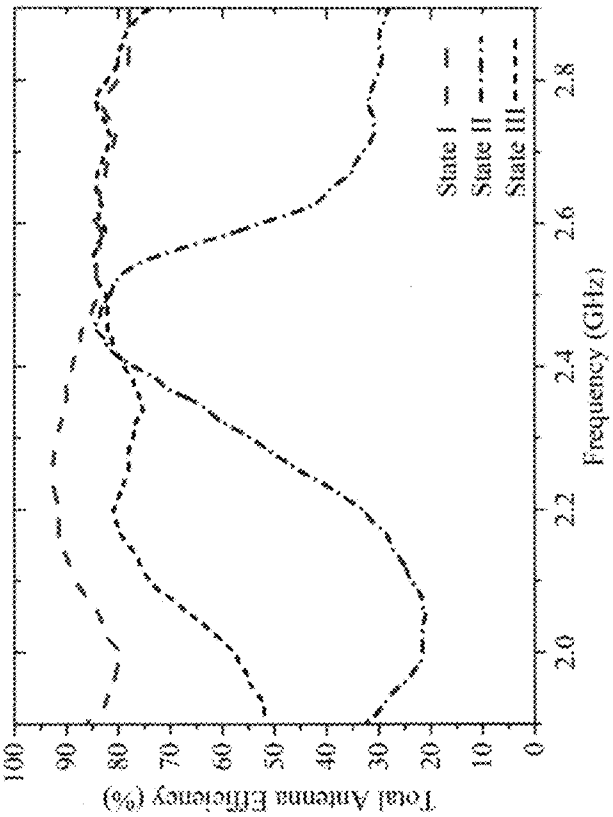
FIG. 16 is a graph showing measured total antenna efficiency (mismatch included) of the antenna of FIG. 12A in the first configuration/mode ("State I"), the second configuration/mode ("State II"), and the configuration/mode ("State III")

FIG. 16 shows the measured total efficiency (mismatch included) of the antenna 1200 in the three different states/modes (State I—broadside, State II—omnidirectional, State III—unidirectional). As shown in FIG. 16, the measured average efficiencies of the antenna 1200 are 86.5%, 79.6%, and 81.4% in States I, II, and III, respectively. Table III summarizes some key features and performances of the antenna 1200 in this embodiment.

TABLE III

Features and performances of the antenna 1200

| $f_o$/ GHz | Reconfigurable Type | Radiation Patterns | Control Method | Total Efficiency | Size/ $\lambda_o^3$ |
|---|---|---|---|---|---|
| 2.46 | Pattern | Omnidirectional, Broadside, and Unilateral | Diodes | 79.6%-86.5% | 0.06 |

$f_o$: center frequency of operating band;
$\lambda_o$: wavelength in air at $f_o$ The antennas 100, 1200 in the above embodiments are pattern reconfigurable antennas. In each of these embodiments, the antenna 100, 1200 includes a multi-layer or multi-portion dielectric resonator, and can selectively produce multiple (at least three) radiation patterns. The antennas 100, 1200 of these embodiments include a generally Y-shaped feedline arrangement, a square-ring slot, and a dielectric resonator antenna loaded parasitic monopole. A switch network with multiple diodes is used in the feed network to reconfigure the radiation pattern. By changing the ON/OFF states of the diodes, the radiation pattern of the antenna can be switched among broadside, omnidirectional, and unilateral modes. The antenna 100, 1200 in these embodiments can be considered to include a multi-layer dielectric resonator antenna, a parasitic monopole antenna, and a feed network that includes a generally Y-shaped feedline arrangement, a square-ring slot, and a switch arrangement with diodes. In these embodiments, the omnidirectional radiation pattern can be obtained by virtue of the parasitic monopole; the broadside radiation pattern can be obtained when the dielectric resonator and radiation mode of the feeding ring slot are excited; the unilateral radiation pattern can be obtained when the parasitic monopole, the dielectric resonator, and the radiation mode of the slot are all excited (hence their radiation fields superimposed). In these embodiments, in the three radiation modes, the radiated E-field is vertically polarized.

The antenna antennas 100, 1200 in the above embodiments, or more generally, the antenna 10 of the invention, can be used in an electrical or electronic device, e.g., a communication device such as a router (e.g., Wi-Fi router), an IoT device, etc. The antenna antennas 100, 1200 in the above embodiments, or more generally, the antenna 10 of the invention, can be made small and compact, which is particularly but not exclusively suitable for miniature or compact communication systems. The antenna antennas 100, 1200 in the above embodiments, or more generally, the antenna 10 of the invention, can be used for indoor wireless communication systems to provide large and flexible signal coverages.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the summary section above. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. For example, the shape, size, form, location, and/or orientation of the substrate may be different from that illustrated (e.g., cuboidal). For example, the shape, size, form, location, and/or orientation of the ground plane may be different from that illustrated (e.g., rectangular cross section). For example, the shape, size, form, location, and/or orientation of the dielectric resonator may be different from that illustrated. For example, the shape, size, form, location, and/or orientation of the hole in the dielectric resonator may be different from that illustrated. The hole can be a blind hole. The hole can be a non-cylindrical hole. The dielectric resonator may include different number of portions (additional portion(s) or less portion(s)). The dielectric resonator may include portion(s) with different dielectric constants or effective dielectric constants. The slot formed on the ground plane may have a different shape, size, form, location, and/or orientation. For example, the slot need not be square-ring shaped. The feedline arrangement may have a different shape, size, form, location, and/or orientation. The antenna may be operable in at least one alternative or additional other frequency or frequency band. The switch arrangement may additionally or alternatively use liquid metal switches, single pole double throws (SPDTs), etc.

The invention claimed is:

1. An antenna comprising:
a radiator arrangement;
a substrate with a first side and a second side opposite the first side;
a ground plane arranged on the first side of the substrate; and
a feed mechanism operably coupled with the radiator arrangement for affecting operation of
the radiator arrangement;
wherein the feed mechanism is configured to selectively operate in, at least, a first state such that the antenna operates in a first mode to provide a broadside radiation pattern, a second state such that the antenna operates in a second mode to provide an omnidirectional radiation pattern, and a third state such that the antenna operates in a third mode to provide a unilateral radiation pattern;
wherein the radiator arrangement is arranged at least partly on the ground plane; the radiator arrangement further comprising:
a dielectric resonator arranged on the ground plane and including a body with a hole; and
a parasitic element arranged at least partly in the hole; the parasitic element connected with the ground plane.

2. The antenna of claim 1, wherein the antenna is arranged to operate at substantially the same frequency or frequency band in the first mode, the second mode, and the third mode.

3. The antenna of claim 1, wherein the broadside radiation pattern, the omnidirectional radiation pattern, and the unilateral radiation pattern selectively provided by the antenna have substantially the same polarization.

4. The antenna of claim 1, wherein the broadside radiation pattern, the omnidirectional radiation pattern, and the unilateral radiation pattern selectively provided by the antenna each has a generally vertically polarized electric field.

5. The antenna of claim 1, wherein the body defines a central axis along an axial direction and the hole extends along an axis offset from and parallel to the central axis.

6. The antenna of claim 5, wherein the body comprises:

a first portion arranged on the ground plane and having a first dielectric constant or effective dielectric constant; and a second portion on the first portion and having a second dielectric constant or effective dielectric constant different from the first dielectric constant or effective dielectric constant;

wherein the first portion is operable to facilitate impedance matching of the antenna.

7. The antenna of claim 6, wherein the body further comprises:

a third portion arranged on the second portion and having a third dielectric constant or effective dielectric constant different from the second dielectric constant or effective dielectric constant;

wherein the third portion is operable to facilitate the providing of the unilateral radiation pattern.

8. The antenna of claim 7, wherein the body is generally cylindrical or prismatic; and wherein the first portion, the second portion and the third portion include substantially the same cross sectional shape and size.

9. The antenna of claim 7, wherein the first portion has a first axial dimension, the second portion has a second axial dimension, and the third portion has a third axial dimension;

wherein the second axial dimension is larger than each of the first axial dimension and the third axial dimension.

10. The antenna of claim 1, wherein the parasitic element is in the form of a probe.

11. The antenna of claim 1, wherein the parasitic element extends at least partly through the substrate.

12. The antenna of claim 6, wherein an end of the parasitic element is arranged in a portion of the hole in the second portion.

13. The antenna of claim 1, wherein the feed mechanism comprises:

a slot formed in the ground plane;

a feedline arrangement arranged on the second side of the substrate; and a switch arrangement operably connected with the feedline arrangement and the slot for selectively affecting operation of the feedline arrangement and the slot hence affecting operation mode of the antenna.

14. The antenna of claim 13, wherein when the feed mechanism operates in the first state, the switch arrangement facilitates activation of a radiation mode of the dielectric resonator and/or a radiation mode of the slot;

wherein when the feed mechanism operates in the second state, the switch arrangement facilitates operation of the parasitic element as a parasitic monopole; and wherein when the feed mechanism operates in the second state, the switch arrangement facilitates (i) activation of the radiation mode of the dielectric resonator and/or the radiation mode of the slot and (ii) operation of the parasitic element as a parasitic monopole.

15. The antenna of claim 13, wherein the switch arrangement comprises a plurality of switch elements operably coupled with the feedline arrangement and the slot.

16. The antenna of claim 15, wherein the plurality of switch elements comprise:

one or more first switch elements operably coupled with the slot; and one or more second switch elements operably coupled with the feedline arrangement;

wherein the one or more first switch elements are operated in a first operation state and the one or more second switch elements are operated in a second operation state when the feed mechanism is operate in the first state;

wherein the one or more first switch elements are operated in the second operation state and the one or more second switch elements are operated in the first operation state when the feed mechanism is operate in the second state; and wherein the one or more first switch elements and the one or more second switch elements are operated in the first operation state when the feed mechanism is operate in the third state.

17. The antenna of claim 16, wherein the first operation state is an OFF state and the second operation state is an ON state.

18. The antenna of claim 16, wherein the one or more first switch elements comprise a plurality of first diodes each respectively connected on the feedline arrangement; and wherein the one or more second switch elements comprise a plurality of second diodes each respectively connected across the slot.

19. The antenna of claim 13, wherein the slot comprises a ring shaped slot including:

first and second slot portions arranged opposite to each other; and third and fourth slot portions arranged opposite to each other and extending between the first and second slot portions.

20. The antenna of claim 19, wherein the slot further comprises one or more open stubs connected with the ring shaped slot.

21. The antenna of claim 20, wherein the slot further comprises:

a first open stub connected at or near an interface between the first and third slot portions; and a second open stub arranged opposite to the first open stub and connected at or near an interface between the second and fourth slot portions.

22. The antenna of claim 13, wherein the feedline arrangement comprises a generally Y-shaped feedline arrangement; and wherein the generally Y-shaped feedline arrangement comprises:

a first feedline portion with a generally elongated feedline;

a second feedline portion with a generally elongated feedline connected at one end of the first feedline portion; and a third feedline portion connected at one end of the second feedline portion opposite to the first feedline portion, the third feedline portion comprises two feedlines extending away from the second feedline portion and arranged at an angle to each other.

23. The antenna of claim 22, wherein the two feedlines of the third feedline portion are end-shorted microstrip lines.

24. The antenna of claim 13, further comprising a control circuit operably connected with the switch arrangement for controlling its operation hence operation mode of the antenna.

* * * * *